United States Patent [19]

Keim

[11] 4,430,914
[45] Feb. 14, 1984

[54] ROTARY APPARATUS FOR ADVANCING A WEB

[75] Inventor: Karl H. Keim, South Portland, Me.

[73] Assignee: Gloucester Engineering Co., Inc., Gloucester, Mass.

[21] Appl. No.: 282,066

[22] Filed: Jul. 10, 1981

[51] Int. Cl.³ .............................................. B26F 1/40
[52] U.S. Cl. .......................................... 83/35; 83/209; 83/236; 83/250; 83/261; 83/364; 83/448
[58] Field of Search .......................... 83/97, 208–210, 83/236, 250, 261, 225–230, 448–450, 35, 364

[56] References Cited

U.S. PATENT DOCUMENTS

| | | | |
|---|---|---|---|
| Re. 29,795 | 10/1978 | Eyeberger | 83/202 |
| 2,722,276 | 11/1955 | Revelle | 164/89 |
| 3,329,995 | 7/1967 | O'Brien et al. | 18/4 |
| 3,348,748 | 10/1967 | O'Brien et al. | 226/53 |
| 3,387,519 | 6/1968 | Nebel | 83/449 |
| 3,388,625 | 6/1968 | O'Brien et al. | 83/238 |
| 3,428,302 | 2/1969 | Lotz | 266/23 |
| 3,461,760 | 8/1969 | White | 83/81 |
| 3,523,392 | 8/1970 | Carl | 83/208 X |
| 3,577,821 | 5/1971 | Medendorp | 83/238 |
| 3,647,127 | 3/1972 | Wiig | 226/155 |
| 3,707,255 | 12/1972 | Ridgeway et al. | 226/136 |
| 3,782,618 | 1/1974 | Voorhees | 226/155 |
| 3,784,075 | 1/1974 | Portmann | 226/143 |
| 3,785,762 | 1/1974 | Entzke | 425/289 |
| 3,933,069 | 1/1976 | Tall et al. | 83/210 |
| 3,948,125 | 4/1976 | Hujer et al. | 83/210 |
| 4,043,494 | 8/1977 | Bickford et al. | 226/109 |
| 4,060,187 | 11/1977 | Grob | 226/8 |

OTHER PUBLICATIONS

Gloucester (CMS) Thermoforming System Trim Press, Operation & Maintenance Manual.

*Primary Examiner*—William R. Briggs
*Assistant Examiner*—Lawrence Meier

[57] ABSTRACT

For use with a thermoforming press adapted to form individual articles in the body of a thermoplastic web which has a degree of inherent stiffness, a trimming station for trimming the formed articles from the web subsequent to their formation characterized by a web transport that comprises at least a pair of rotary advancing devices directly engaged with the web at spaced apart locations across the width of the web, a drive for periodically rotating the advancing devices to produce indexing movement to the trimming press and means to periodically release the drive engagement of the rotary advancing devices with the web to enable relaxation of stress developed in the thermoplastic web and to allow the interaction of the web with the guides to realign the web in the absence of constraint by the rotary advancing devices, and the method of operation thereof. In the embodiment shown the rotary advancing devices positively engage the web, the drive is accurately controlled to move the web a predetermined distance after sensing of the approach of the formed article toward the trimming position, and the release of the advancing means occurs after the trim die has engaged the web, during selected trim cycles.

15 Claims, 9 Drawing Figures

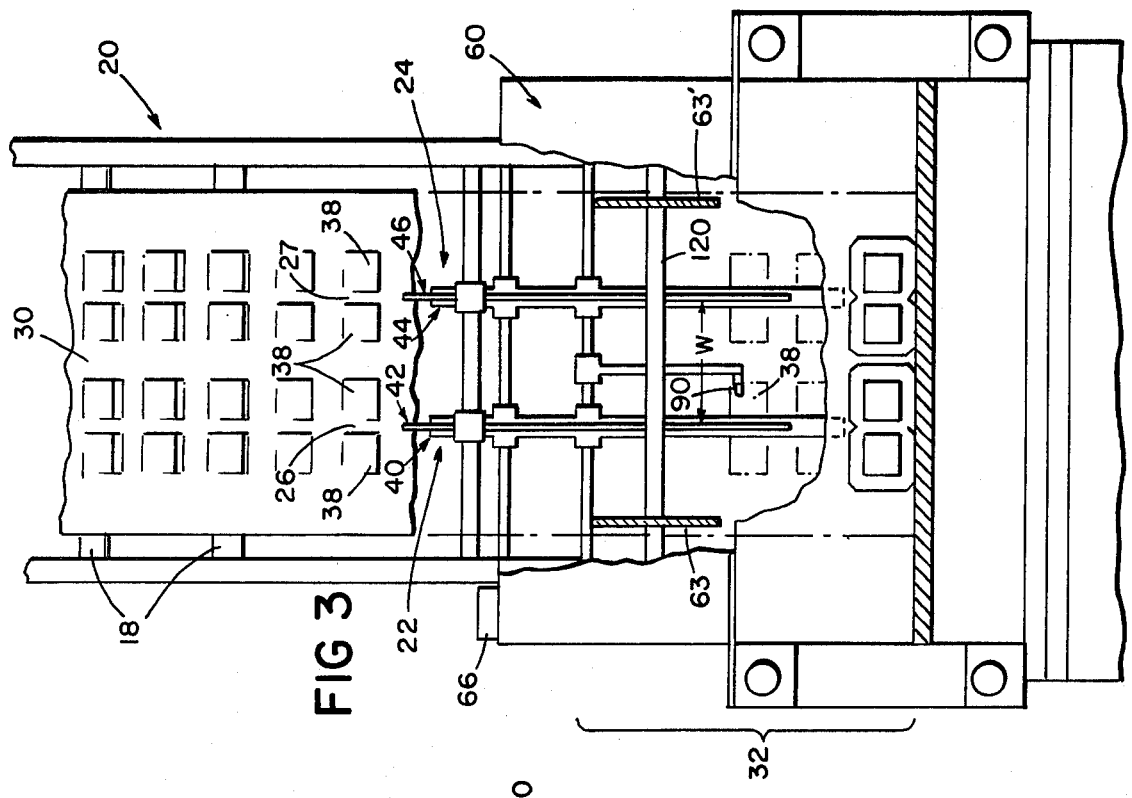
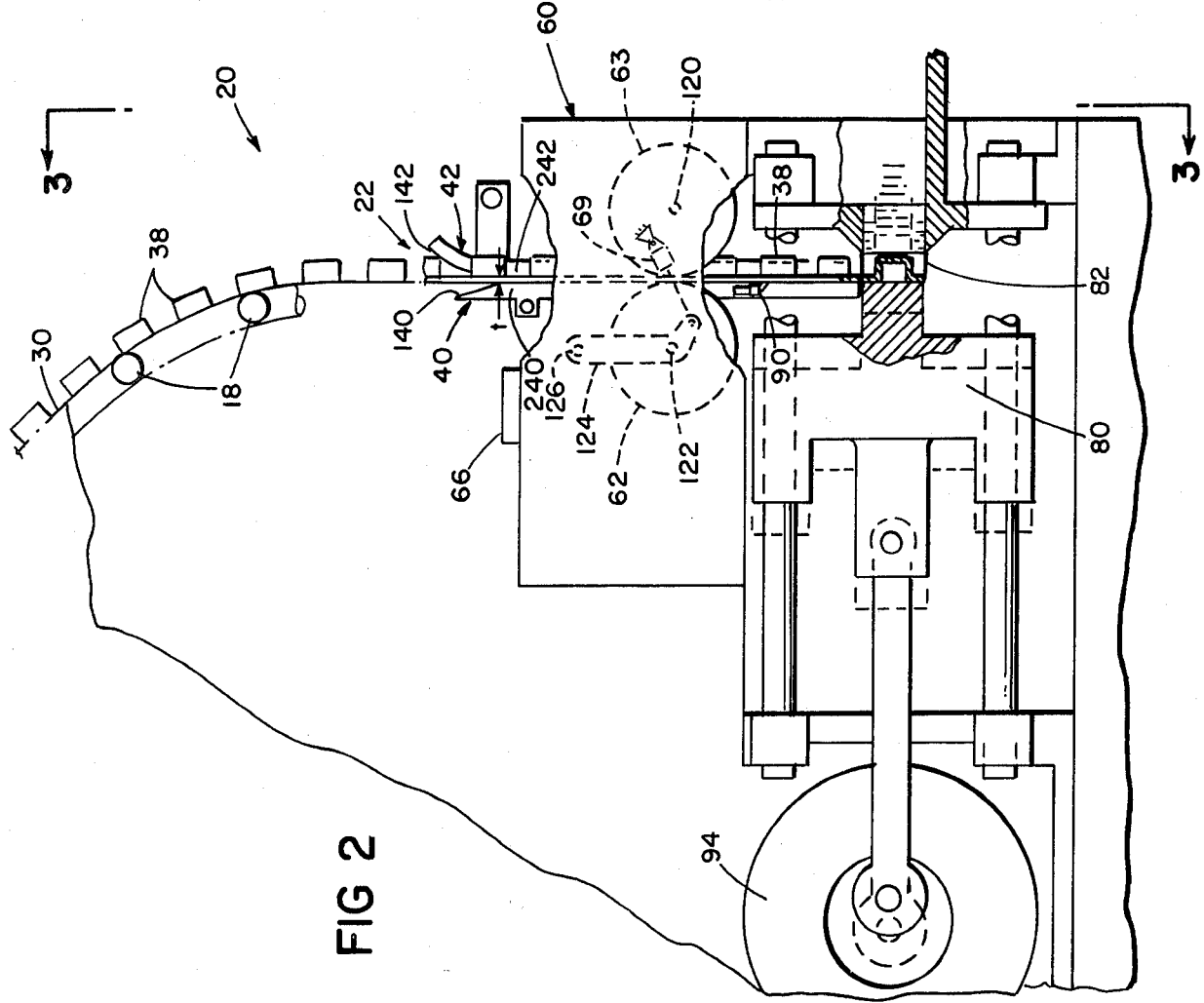

ROTARY APPARATUS FOR ADVANCING A WEB

FIELD OF THE INVENTION

This invention relates to apparatus for trimming articles from a thermoformed web.

BACKGROUND OF THE INVENTION

Thermoformed parts are typically formed by the action of a forming die upon a continuous thermoplastic web and the parts, after receiving their form, remain in the web and are led to a second station where they are trimmed from the web by the action of a trimming die. The web carrying the parts is indexed into registry with the trim die. Due to the nature of the thermoformable substance of the web, e.g. nonuniform shrinkage, variation in index length occurs. Even between consecutive ranks of formed parts, variations of the order of 0.005 inches are not atypical. To provide accurate positioning, the parts must be indexed according to measurements performed close to the trim die, preferably on the part to be trimmed, but the indexing means must be clear of the die for the trimming operation. Typically this indexing is done by the action of reciprocating fingers. These engage the web, draw the web a predetermined distance into alignment with the die, and return for a further stroke. The necessary size of the fingers and the required acceleration and deceleration limit the speed of operation. Also, the width of the finger represents unusable area of the plastic web.

Experience has shown that trim machines of this type are capable of speeds of less than 100 cycles per minute for sustained operation. Faster speeds, though occasionally possible, usually involve vibrations in work conditions that require frequent maintenance of the machine, and also introduce inaccuracies in the trimming of the parts.

There have been prior efforts to substitute other drive devices for the fingers. One system has attempted to use rotary nipping devices at each side of the web. These have not found wide-spread use, partly because of problems of jamming of the feed. Die pins, used to locate and position metal webs in the distinctly different field of metal stamping and punching operations may not be employed in the thermoforming field due to the nonuniform shrink characteristics of the thermoformable web.

It is an objective of this invention to provide a device to provide an improved reliable trim press capable of high speed, accurate operation on thermoformed webs.

SUMMARY OF THE INVENTION

The invention, for use with a thermoforming press adapted to form individual articles in the body of a thermoplastic web which has a degree of inherent stiffness, relates to a trimming station for trimming the formed articles from the web subsequent to their formation. The trimming station includes a trimming press mounted for reciprocating movement against the web for trimming the articles from the web, web transport means to advance the web to the trimming station in repeated indexing movement, and a web guide means directly engaging the web and positioned to guide the advancing web into registry with the trimming press.

According to the invention, the web transport means comprises at least a pair of rotary advancing means directly engaged with the web at spaced apart locations across the width of the web, a drive means for periodically rotating the advancing means to produce indexing movement and release means to periodically release the drive engagement of the rotary advancing means with the web to enable relaxation of stress developed in the web and to allow the interaction of the web with the guide means to realign the web in the absence of constraint by the rotary advancing means. Also according to the invention, a method of trimming thermoformed parts from a thermoplastic web is provided using the above periodic releasing action of the rotary advancing means.

The preferred embodiment features the rotary advancing devices positively engaging the web, the drive accurately controlled to move the web a predetermined distance after sensing of the approach of the formed article toward the trimming position, and the release of the advancing means occurs after the trim die has engaged the web, during selected trim cycles.

Further features in preferred embodiments are as follows: each rotary advancing means comprises a pair of rotary elements defining a drive nip with at least one element of each pair being driven; the rotary elements comprise annular disks that converge on the web surface gradually, the disks having diameters of the order of 6 inches or more; the driven disks have non-slip surfaces; the means for periodically releasing the drive engagement of the rotary advancing means comprises means to move an element of the rotary advancing means momentarily out of contact with the web; the drive engagement of the rotary advancing means is released after the elapse of more than one trimming cycle; the rotary element is carried on a shaft and shaft-moving means associated with the shaft are adapted to move the shaft away from the web to disengage the element from the web; the shaft is carried by a bell crank; two shafts extend across the web, one over each face, one element of each of the pair of rotary advancing means being carried on one shaft at one face of the web and another rotary element of each pair being carried at the other face, and a chain drive means driving both shafts, and the release means comprises means to move one shaft away from the web in a motion that maintains drive engagement of the chain with both of the shafts; the machine is further comprised of a sensor means to signal the position of the web and a control circuit activated by the sensor to decelerate the drive means over a predetermined distance; the drive means is comprised of a stepping motor and the control circuit produces a series of drive pulses to decelerate the motor over a predetermined distance; the sensor means is a light sensor and fiberoptic cable; and the guide means comprises stationary guide bars positioned at opposite faces of the web and arranged to slideably engage the web as it advances to the trim press.

These and other objects and features of the invention will be understood from the following description of a preferred embodiment.

PREFERRED EMBODIMENT

The structure and operation of a preferred embodiment of the invention will now be described, after first briefly describing the drawings.

FIG. 2 is a side view of said preferred embodiment, while FIG. 3 is a face view thereof taken at the line 3—3 of FIG. 2;

Figure 7A:
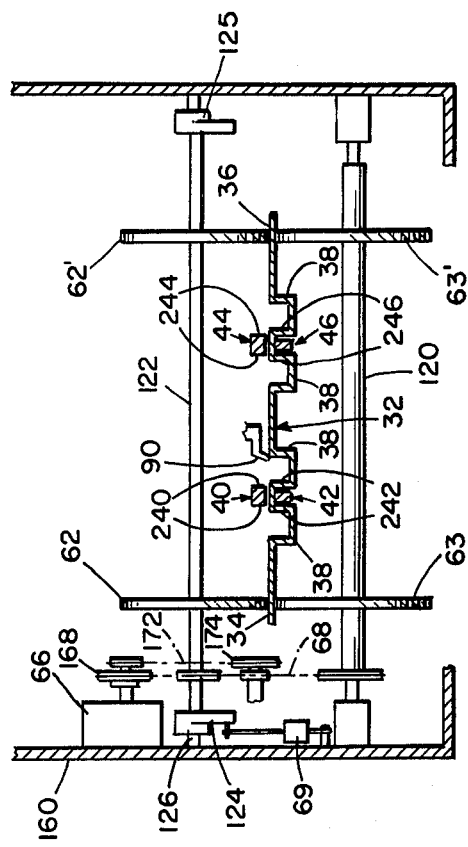
Figure 7B:
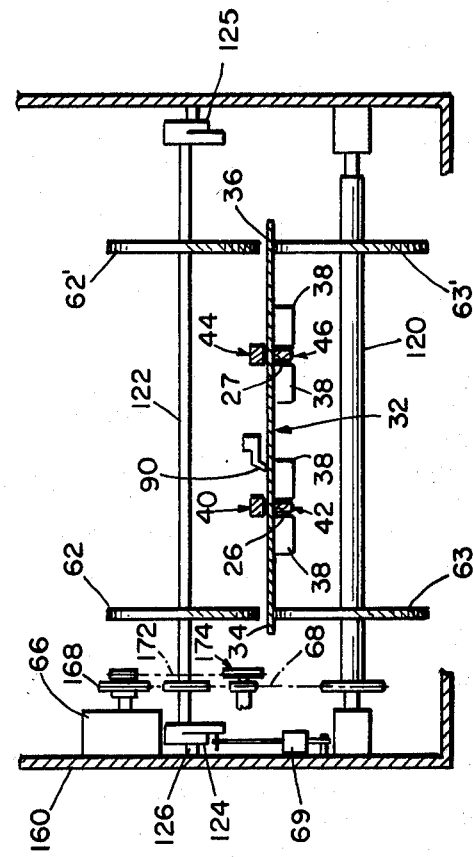
Figure 6A:
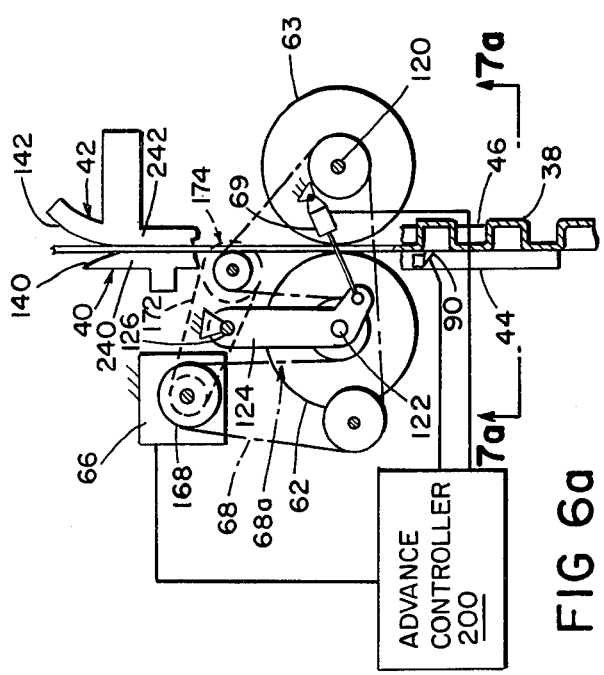
Figure 6B:
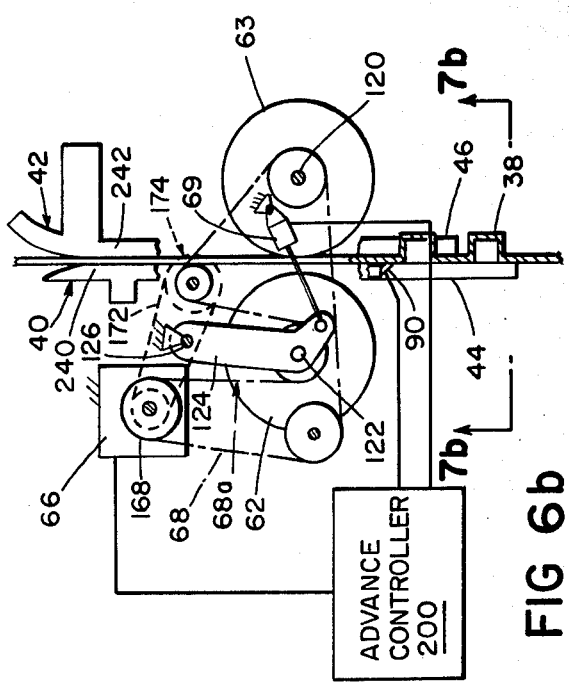

FIGS. 6a and 6b are schematic side views of the web advancing apparatus showing the disks in the engaged and disengaged positions, respectively; and FIGS. 7a and 7b are schematic bottom views of the web advancing apparatus at lines 7a–7b and 7b–7b of FIGS. 6a and 6b, respectively.

Figure 1:
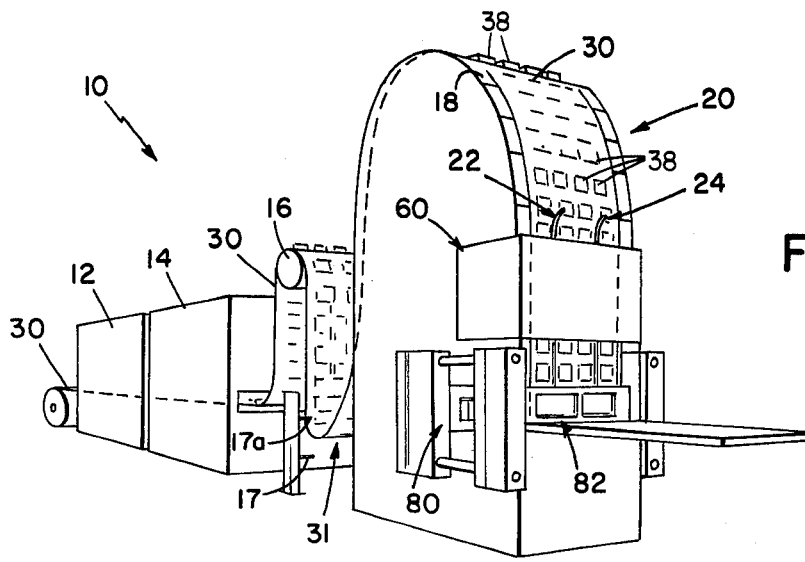
FIG. 1 is an isometric view of a thermoforming line with a trimming station according to the preferred embodiment.
Figure 4:
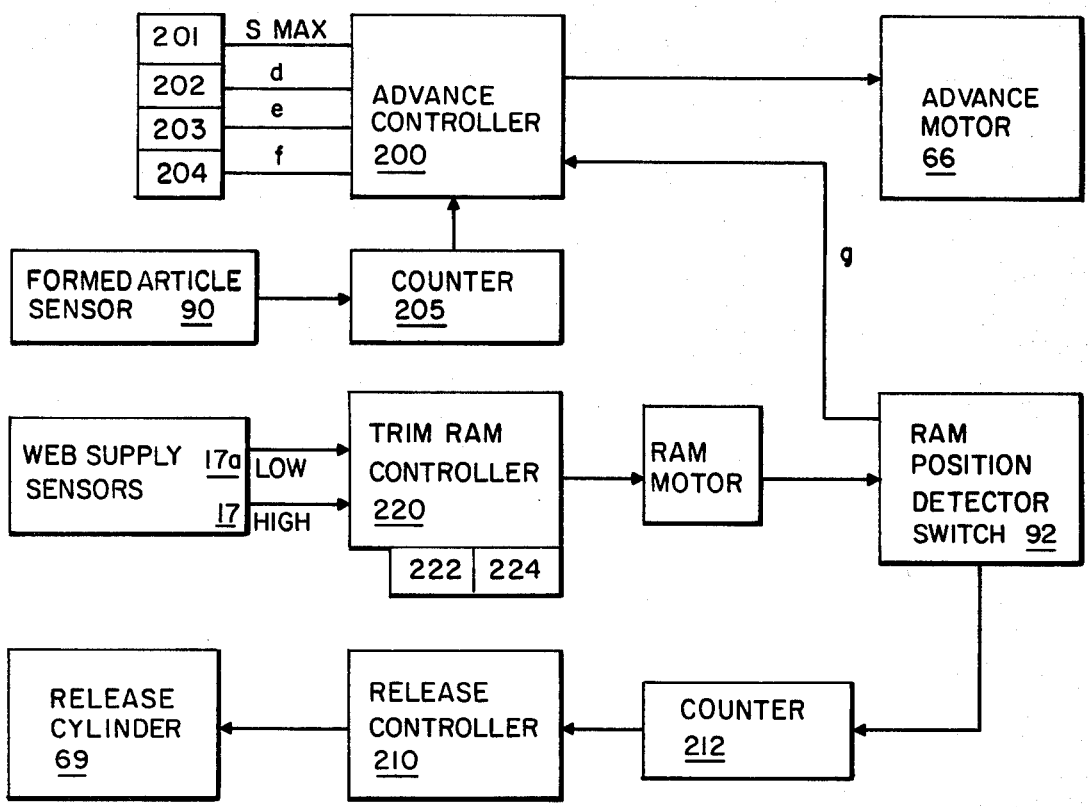
FIG. 4 is a schematic diagram of the electronic control circuitry.

In FIG. 1, there is shown a thermoforming apparatus 10, comprised of preheating oven 12, forming station 14 and trimming station 20, for producing articles, e.g. egg cartons or hamburger trays, from a continuous web 30 of thermoformable material, e.g. polystyrene foam, high impact polystyrene or polypropylene.

Web 30 is advanced through oven 12 where it is heated to a temperature suitable for thermoforming, and into forming press 14 where identical articles 38 are periodically formed in the web.

The web is carried over horizontal support roller 16, and support surface 18, between which is formed loop 31, the length of which is detected by high and low photosensors 17a, 17. The web is fed from surface 18 into arcuate web alignment guides 22, 24 (FIG. 3) which occupy two machine direction ways 26, 27 between formed articles or other formation in the web. These guides comprise two pair of elongated parallel, arcuate guide members 40, 42 and 44, 46, longitudinally aligned with the direction of advance of the web, with a transverse distance (W) therebetween which is adjustable depending on the article being produced, e.g. 12 inches for hamburger trays, 24 inches for egg cartons. The gap (t) between member pairs 40, 42 and 44, 46 of alignment guides 22, 24 is adjusted to approximate the thickness of web 30 to allow the opposing faces of guides 22, 24 (faces 140, 142 of member pair 40, 42 of guide 22 are shown) to restrict horizontal movement of web 30 in the guide section. The lateral edges (240, 242, 244, 246) of the guides are disposed to be engaged by thermoformed formations of the web that bound the guide ways 26, 27 for cooperation with release of the advancing means to guide the web in the correct track.

Web section 32, FIG. 3, at the downstream end of guides 22, 24, is engaged by web advancing unit 60 which consists of two pair of large, equal diameter disks 62, 63, and 62′, 63′, typically 12 inches in diameter. Disks 63, 63′ are fixed on shaft 120 which rotates in bearings fixed to frame 160 of web advancing unit 60. Disks 62, 62′ are fixed on shaft 122 which rotates in bearings on arms 124, 125 which pivot at their upper ends on axis 126. The lower end of arm 124 is connected to release cylinder 69 which operates to move arm 124, and, thereby shaft 122 and disks 62, 62′, in an arc about axis 126. The disks 62, 62′, 63, and 63′ are driven as a unit by electric stepping motor 66 via initial drive chain 172 through dual sprocket 174, which drives main drive chain 68, these being engineered to reduce the speed of motor 66 to the desired drive speed. The main drive chain 68 engages sprockets on each shaft and provides a loop 68a which runs generally parallel to arm 124. (Sprocket 168 idles on the drive shaft of stepping motor 66). The face surfaces of each pair of driven disks coact to form drive nip for web section 32. The disks, typically steel, have antifriction outer surfaces, e.g. knurled or diamond construction, and are hardened for wear resistance.

As shown in FIGS. 6a and 7a, the driven disk pairs 62, 63 and 62′, 63′ are disposed at outer transverse extremities 34, 36 of the web, each nip having a gradually converging web-receiving opening (due to the relatively large diameter of the disks) and an operational gap of the order of the thickness of the web material. The rotary motion of the disks when closed to the operational gap serves to positively advance the web through the apparatus.

The shaft carrying one disk 62, 62′ of each driven pair is positioned by spring-return pneumatic release cylinder 69. In the normal operating, i.e. return position (FIGS. 2, 6a and 7a) the cylinder 69 is retracted to set the gap between disks 62, 63 to the operational distance to positively advance web 30. In the extended position of the cylinder (FIGS. 6b, 7b), drive disks 62, 62′ are displaced a short distance, e.g. ⅛ to ¼ inch, from the web, while the die 82 is engaged on web section 32. This relieves any torque, i.e. drive shaft twist, developed along the shafts of the disks due, e.g., to nonuniformities or slippage, that could lead to differences of advance between the two nip pairs. This also disengages web section 32 from the driven nip to allow it to realign with the guided portion of the main body of web 30 to remove any buckling or binding due, e.g., to shrinkage or variations in thickness, or inaccurate tracking between the two drive nips. This releasing operation is typically performed every second or third stroke to prevent undue accumulation of error. However, it may be performed more or less frequently as required by the nature, i.e. stability, of the thermoformable material of the web.

The operation of the apparatus is controlled via three controllers as shown in FIG. 3, i.e. advance controller 200, release controller 210, and trim ram controller 220, the operations of which are described beginning with a trimming cycle in which releasing movement of drive disks 62, 62′ occurs.

Figure 5:
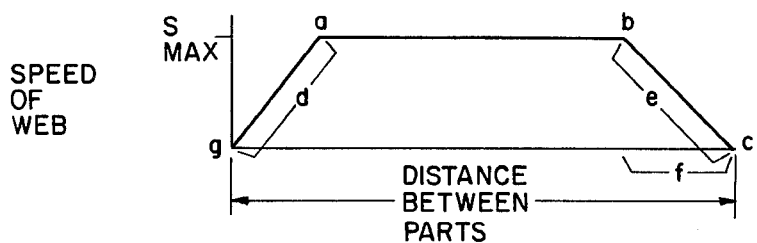
FIG. 5 is a representative plot of the speed of advance of the web through the apparatus.

At the end of each trimming cycle, cutter ram 80 is in trimming position (FIG. 2, solid lines), the drive disks 62, 63 and 62′, 63′ are positively engaged on the surfaces of web section 32 (FIGS. 6a, 7a) and drive motor 66 is off. Ram 80 retracts to provide clearance for the articles in the web between the die parts. This is done by various means, e.g. by rotating the entire advancing mechanism away from the female die part. As ram 80 retracts die 82, cam actuated, ram position detector switch 92 (not shown) on the ram fly wheel 94 is moved to its first position and signals advance controller 200. Advance controller 200 is preset by means of thumb wheels (201, 202, 203, 204, FIG. 5) and counter 205 to the maximum advance speed (Smax), the time (d) for acceleration to the maximum speed, the time (e) for deceleration to a stop (which are typically set to accommodate the maximum ram speed), the distance (f) for deceleration to a stop, and the number of intermediate ridges in the article which is to be trimmed (counter 205). On receiving the signal from switch 92, advance controller 200 outputs pulses to stepping motor 66, increasing the advance speed to Smax over time (d) and continuing at that speed until signaled by formed article sensor 90 of the approach of the back edge of the next article in web 30.

Formed article sensor 90, a fibre optic sensor, of the type supplied by Dolan-Jenner Industries, Inc., of Woburn, Mass., is comprised of a 2-direction fibre optic cable directing light toward the web and detecting the reflection or lack of reflection. Counter 205 is set for the number of intermediate dividers that will be detected by sensor 90 before the end of the article is detected (b, FIG. 5). When controller 200 receives the proper signal from sensor 90, as determined by counter 205, it decelerates the rate of pulses output to motor 66 over time (e) as preset on thumb wheel 203 to positively advance web 30 over distance (f), set at thumb wheel 204.

After the web advance is stopped (c, FIG. 5), ram 80 extends to engage die 82 on web 30 and trim the article. This stroke also severs the skeleton of the prior article from the web to be conveyed away as scrap. The cam which rotates with the fly wheel of ram 80 has a raised portion coincident with the die-trimming portion of the stroke. This raised portion holds cam switch 92 in its second position which outputs a signal to counter 212 at release controller 210. Counter 212 is preset to determine the number of trimming cycles, e.g. 1, 2 or 3, between each release cycle. If the chosen number of trimming cycles has elapsed, release controller 210, via a solenoid valve, actuates pneumatic release cylinder 69 which extends to release nipping disks 62, 62' from engagement on web section 32 after die 82 is engaged thereon.

This release allows web section 32 to relax and realign vertically with the alignment guides 22, 24 and also allows the drive mechanism 60 to release any torque developed during the advancing process, e.g. from any differential displacement due to differences in the disks, so no undue accumulation of error occurs. No displacement of the article in the web can occur because the ram-carried trim die has already engaged the web about the article.

Cylinder 69 remains extended while the ram fly wheel cam continues to activate switch 92 to its second position, then returns to its operational position, i.e. to close the nipping disks to their positive driving engagement with the web.

The third controller unit, i.e. trim ram controller 220, controls the rotational speed of the fly wheel that drives ram 80 between high and low speeds preset on potentiometers 222, 224, typically to provide about 125 strokes per minute or above. Trim ram controller 220 receives input from web supply photosensors 17, 17a which sense the amount of material in loop 31 between the thermoformer 14 and the trim press 20 by the length of the loop and signal respectively for high and low speeds. The potentiometers are typically set 10 strokes per minutes apart, e.g. 125 and 135 strokes per minutes, and the controller "hunts" between the speeds to maintain the web loop between the sensors. Controller 220 outputs its signal to an eddy current drive (not shown) which operates the motor which drives the fly wheel.

Other Embodiments

Other embodiments are within the scope of the following claims. For example, the web transport means may be comprised of other elements adapted for operation in one direction, e.g. belting. The rotary advancing elements may be driven independently, e.g. by means of digital electronic, or electro-hydraulic, stepping motors receiving signals from a single source; or only the elements at one web face may be driven, e.g. against an idling roller on the opposite web face. More than two pair of advancing elements may also be employed. Further, the web advancing apparatus may be employed for any type of formed articles, and may be retrofit for existing trimming press apparatus.

In the claims:
What is claimed is:

1. For use with a thermoforming press adapted to form individual articles in the body of a thermoplastic web which has a degree of inherent stiffness,
   a trimming station for trimming the formed articles from the web subsequent to their formation,
   said trimming station including a trimming press mounted for reciprocating movement against the web for trimming the articles from the web,
   web transport means to advance said web to said trimming station in repeated indexing movement, and
   a web guide means directly engaging the web and positioned to guide the advancing web into registry with said trimming press,
   the improvement wherein said web transport means comprises at least a pair of rotary advancing means directly engaged with the web at spaced apart locations across the width of the web,
   a drive means for periodically rotating said advancing means to produce said indexing movement and release means to periodically release the drive engagement of said rotary advancing means with said web to enable relaxation of stress developed in the web and to allow the interaction of the web with said guide means to realign the web in the absence of constraint by said rotary advancing means.

2. The machine of claim 1 wherein each of said rotary advancing means comprises a pair of rotary elements defining a drive nip, at least one of each pair being a driven element.

3. The machine of claim 2 wherein said rotary elements comprise annular disks that converge on said web surface gradually, said disks having diameters of the order of 6 inches or more.

4. The machine of claim 3 wherein each driven disk has a non-slip surface.

5. The machine of claim 1 wherein said means for periodically releasing the drive engagement of a said rotary advancing means comprises means to move an element of said rotary advancing means momentarily out of contact with said web.

6. The machine of claim 5 further comprising control means adapted to signal said release means after the elapse of more than one trimming cycle.

7. The machine of claim 5 wherein said rotary element is carried on a shaft and shaft moving means associated with said shaft are adapted to move said shaft away from said web to disengage said element from said web.

8. The machine of claim 7 wherein said shaft moving means is a bell crank carrying said shaft.

9. The machine of claim 7 wherein two shafts extend across the web, one over each face, one rotary element of each pair being carried on one shaft at one face of the web and another rotary element of each pair being carried on the other shaft at the other face of the web, a chain drive means driving both of said shafts whereby all rotary elements are driven, and said release means comprises means to move one shaft away from said web in a motion that maintains drive engagement of said chain with both of said shafts.

10. The trimming machine of any of the foregoing claims wherein said machine is further comprised of a sensor means to signal the position of said web and a control circuit activated by said sensor to decelerate said drive means over a predetermined distance.

11. The machine of claim 10 wherein said drive means is comprised of a stepping motor and said control circuit is adapted to produce a series of drive pulses to said stepping motor to decelerate said motor over a predetermined distance.

12. The machine of claim 10 wherein said sensor means is comprised of a light sensor and cooperative fibre optic cable.

13. The machine of claim 1 wherein said guide means comprises stationary guide bars positioned at opposite faces of the web and arranged to slideably engage said web as it advances to said trim press.

14. The apparatus of any of the foregoing claims 1-9 wherein said rotary advancing means is adapted to positively engage the web, means are provided to accurately control said drive to move the web a predetermined distance after sensing of the approach of the formed article toward the trimming station, and said release means is adapted to release the drive engagement of said rotary advancing means with the web after the trim die has engaged the web, during selected trim cycles.

15. In a method for use with a thermoforming press adapted to form individual articles in the body of a thermoplastic web which has a degree of inherent stiffness, said method using a trimming station for trimming the formed articles from the web subsequent to their formation, said trimming station including a trimming press mounted for reciprocating movement against the web for trimming the articles from the web, web transport means to advance said web to said trimming station in repeated indexing movement, and a web guide means directly engaging the web and positioned to guide the advancing web into registry with said trimming press, the improvement in said method including transporting said web to said trimming station by means of at least a pair of rotary advancing means directly engaged with the web at spaced locations across the width of the web, periodically rotating said advancing means to produce said indexing movement and periodically releasing the drive engagement of said rotary advancing means with said web to allow the interaction of the web with said guide means to realign the web in the absence of constraint by said rotary advancing means.

* * * * *

UNITED STATES PATENT OFFICE
CERTIFICATE OF CORRECTION

Patent No. 4,430,914　　　　　　　　　　Dated February 14, 1984

Inventor(s) Karl H. Keim

It is certified that error appears in the above-identified patent and that said Letters Patent are hereby corrected as shown below:

Col. 5, line 41, "220" should be --120--.

Signed and Sealed this

Seventh Day of August 1984

[SEAL]

Attest:

Attesting Officer

GERALD J. MOSSINGHOFF

Commissioner of Patents and Trademarks